US011286387B2

(12) United States Patent
Beisele et al.

(10) Patent No.: US 11,286,387 B2
(45) Date of Patent: Mar. 29, 2022

(54) CURABLE POLYURETHANE COMPOSITION FOR THE PREPARATION OF OUTDOOR ARTICLES, AND THE ARTICLES OBTAINED THEREFROM

(71) Applicant: Huntsman Advanced Materials Licensing (Switzerland) GmbH, The Woodlands, TX (US)

(72) Inventors: Christian Beisele, Müllheim (DE); Hongyan Chen, Shanghai (CN); Satoru Hishikawa, Osaka (JP)

(73) Assignee: HUNTSMAN ADVANCED MATERIALS (Switzerland) GmbH

( * ) Notice: Subject to any disclaimer, the term of this patent is extended or adjusted under 35 U.S.C. 154(b) by 154 days.

(21) Appl. No.: 15/778,087

(22) PCT Filed: Nov. 7, 2016

(86) PCT No.: PCT/EP2016/076813
§ 371 (c)(1),
(2) Date: May 22, 2018

(87) PCT Pub. No.: WO2017/089103
PCT Pub. Date: Jun. 1, 2017

(65) Prior Publication Data
US 2018/0346717 A1    Dec. 6, 2018

(51) Int. Cl.
| | |
|---|---|
| *C08L 75/04* | (2006.01) |
| *C08G 18/72* | (2006.01) |
| *C08G 18/48* | (2006.01) |
| *C08G 18/79* | (2006.01) |
| *C08G 18/20* | (2006.01) |
| *C08K 3/013* | (2018.01) |
| *C08K 3/22* | (2006.01) |
| *C08K 3/36* | (2006.01) |

(52) U.S. Cl.
CPC .......... *C08L 75/04* (2013.01); *C08G 18/2081* (2013.01); *C08G 18/4825* (2013.01); *C08G 18/722* (2013.01); *C08G 18/792* (2013.01); *C08K 3/013* (2018.01); *C08K 3/22* (2013.01); *C08K 3/36* (2013.01); *C08K 2003/2217* (2013.01); *C08K 2003/2227* (2013.01); *C08K 2003/2237* (2013.01)

(58) Field of Classification Search
CPC .............................. C08L 75/04; C08G 18/722
See application file for complete search history.

(56) References Cited

U.S. PATENT DOCUMENTS

| | | | |
|---|---|---|---|
| 3,941,855 A | 3/1976 | Ehrhard | |
| 4,412,962 A * | 11/1983 | Bessette | .................. B29C 31/04 249/117 |
| 4,419,513 A | 12/1983 | Breidenbach et al. | |
| 2004/0249108 A1 | 12/2004 | Dietrich et al. | |
| 2007/0142607 A1 | 6/2007 | Harasin et al. | |
| 2010/0116179 A1* | 5/2010 | Baker | ...................... B32B 27/22 108/57.25 |
| 2011/0251335 A1 | 10/2011 | Elizade et al. | |
| 2011/0281965 A1 | 11/2011 | Laas et al. | |
| 2012/0065295 A1 | 3/2012 | Grindling et al. | |

FOREIGN PATENT DOCUMENTS

| | | |
|---|---|---|
| CA | 2154107 C | 2/2008 |
| CN | 101792639 A | 8/2008 |
| CN | 104987823 A | 10/2015 |
| EP | 0693512 A1 | 1/1996 |

OTHER PUBLICATIONS

Machine translation of EP 0 693 512 A1, published Jan. 24, 1996. (Year: 1996).*
PCT International Search Report and Written Opinion of the International Searching Authority, dated Dec. 6, 2016, and issued during the Prosecution of application No. PCT/EP2016/076813, 8 pages.
Espacenet English abstract for patent application No. CN104987823, published on Oct. 21, 2015, 1 page.
Espacenet English abstract for patent application No. EP0693512, published on Jan. 24, 1996, 1 page.
Hrsg. G. Oertel "handbook Polyurethane", Kunststoff Handbuch, Band 7, 3. Auflage, ISBN 3-446-16263-1, pp. 499-501.

* cited by examiner

*Primary Examiner* — Vickey Nerangis
(74) *Attorney, Agent, or Firm* — Huntsman Advanced Materials (Switzerland) GmbH; Robert Diaz

(57) ABSTRACT

A curable composition comprising a mixture of homopolymers of an aliphatic polyisocyanate and a cycloaliphatic polyisocyanate, a polyester polyol or polyether polyol and a filler. The composition is particularly suitable for use in the manufacture of outdoor insulation system articles.

5 Claims, No Drawings

CURABLE POLYURETHANE COMPOSITION FOR THE PREPARATION OF OUTDOOR ARTICLES, AND THE ARTICLES OBTAINED THEREFROM

CROSS-REFERENCE TO RELATED APPLICATIONS

This application is a National Stage application filed under 35 U.S.C. § 371 of International Application No. PCT/EP2016/076813 filed Nov. 7, 2016 which designated the U.S. and which claims priority to International Application No. PCT/CN2015/095284 filed Nov. 23, 2015. The noted applications are hereby incorporated herein by reference in their entirety.

FIELD OF INVENTION

The present invention relates to a curable polyurethane (PU) composition, a process for the preparation of outdoor articles, such as insulation systems for electrical engineering, wherein the PU composition is used, and the articles obtained by the said process. The outdoor articles exhibit good mechanical, electrical and dielectrical properties and can be used as, for example, insulators, bushings, switchgears and instrument transformers.

BACKGROUND OF THE INVENTION

Epoxy resin compositions are commonly used for the preparation of insulation systems for electrical engineering. However, most of these epoxy resin compositions utilize anhydrides as curing agents. Due to the developing regulatory framework for chemicals, it is expected that the use of anhydrides in epoxy resins will be restricted in the near future, because of their R42 label (respiratory sensitizer). Therefore, some anhydrides are already on the SVHC candidate list (substances of very high concern) of the REACH regulation. It is likely that in some years these substances may no longer be used without special authorisation. As methyl hexahydrophthalic anhydride (MHHPA) and hexahydrophthalic anhydride (HHPA) are widely used as the main curing agents for cycloaliphatic outdoor epoxy resins for electrical insulation applications, there is a future need for alternative solutions that are not regarded as SVHC. As known anhydrides are R42-labeled and even yet unknown anhydrides would be expected by toxicologists to be also R42-labeled, a solution that is free of anhydrides is desirable.

Cycloaliphatic polyurethane compositions as suggested in the handbook "Polyurethane" (Kunststoff Handbuch, Band 7, 3. Auflage, ISBN 3-446-16263-1, Hrsg. G. Oertel, pages 499-501) can also be used for the preparation of outdoor insulation systems for electrical engineering. However, such compositions containing isocyanates or prepolymers of isocyanates and polyols contain a considerable amount of free isocyanates which are also regarded as respiratory sensitizer (R42 label). Therefore, cycloaliphatic polyurethane compositions are not a good solution to the REACH problem, either. A solution that is R42-free is desirable.

A PU composition for the preparation of encased electrical insulation articles is suggested in U.S. Pat. No. 3,941,855. Aliphatic and cycloaliphatic isocyanates are used in this composition. However, the composition disclosed contains free isocyanates which are R42 labelled.

A PU composition for the preparation of rigid, lightfast articles is suggested in US 20110281965. The lightfast articles are useful as a substitute for mineral glass for the production of window panes for vehicles and aircrafts, for the production of optical lenses and spectacle lenses, or as potting compounds for electronic or optoelectronic components. However, the document is silent on the use of the disclosed composition for the preparation of insulation systems for medium and high voltage electrical engineering.

Accordingly, there is a need for a composition which is not R42 labelled and which advantageously can be used in casting or encapsulation applications for manufacturing of insulation systems for medium and high voltage electrical engineering, such as switchgear or transformer applications, suitable for outdoor use.

It is an object of the present invention to provide a PU composition which is suitable for the preparation of articles exposed to outdoor conditions, such as outdoor insulation systems for medium and high voltage electrical engineering. The composition shall be R42-free and SVHC-free, and distinguished by a low water pick-up, a very good water diffusion break down strength, good tracking and erosion resistance and a long pot life (good latency). Still another object of the present invention is to provide the encased articles obtained from potting or encapsulation process which exhibit good mechanical, electrical and dielectrical properties, and can be used in outdoor applications, for example, as insulators, bushings, switchgears and instrument transformers in medium and high voltage electrical engineering.

Surprisingly, it has been found that the use of a mixture of homopolymers of isocyanates, polyols and certain fillers provides PU systems which meet the above objectives.

DETAILED DESCRIPTION

Accordingly, the present invention relates to a curable composition comprising (A) a mixture of homopolymers of polyisocyanates comprising
  (a1) from 50 wt % to 90 wt % of at least one homopolymer of an aliphatic poly-isocyanate, and
  (a2) from 10 wt % to 50 wt % of at least one homopolymer of a cycloaliphatic poly-isocyanate, each based on the total weight of (a1) and (a2), (B) at least one polyol selected from the group of polyether polyol and polyester polyol, (C) at least one filler selected from the group of quartz sand, quartz powder, silica, aluminium oxide, titanium oxide, zirconium oxide, $Mg(OH)_2$, $Al(OH)_3$, dolomite [$CaMg\,(CO_3)_2$], AlO(OH), silicon nitride, boron nitride, aluminium nitride, silicon carbide, boron carbide, chalk, calcium carbonate, barite, gypsum, hydromagnesite, zeolites, talcum, mica, kaolin and wollastonite, wherein the at least one filler may be silanized.

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article. By way of example, "a resin" means one resin or more than one resin.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

It should be clear that the term "polyurethane (PU)", as used herein, is not limited to those polymers which include only urethane or polyurethane linkages. It is well understood by those of ordinary skill in the art of preparing polyurethanes that the polyurethane polymers may also include, for example, allophanate and uretdione groups, and other linkages in addition to urethane linkages.

The term polyisocyanate is understood to mean a compound which has two or more isocyanate groups. Diisocyanates, such as hexamethylene diisocyanate (HDI) or isophorone diisocyanate (IPDI), are commonly referred to as polyisocyanates, because they carry more than one isocyanate group.

According to one embodiment of the present invention, the polyisocyanates include those represented by the formula Q(NCO)$_n$, where n is, for example, a number from 2-5, preferably 2-3 and Q is an aliphatic hydrocarbon group containing, for example, 2-12 carbon atoms, or a cycloaliphatic hydrocarbon group containing, for example, 5-18 carbon atoms.

Examples of aliphatic polyisocyanates include, but are not limited to, ethylene diisocyanate, 1,4-tetramethylene diisocyanate, hexamethylene-1,6-diisocyanate, and 1,12-dodecane diisocyanate.

Examples of cycloaliphatic polyisocyanates include, but are not limited to, cyclobutane-1,3-diisocyanate, cyclohexane-1,3-diisocyanate, cyclohexane-1,4-diisocyanate and mixtures of these isomers; isophorone diisocyanate, 2,4- and 2,6-hexahydrotoluene diisocyanate and mixtures of these isomers, and dicyclohexylmethane-4,4'-diisocyanate (hydrogenated MDI or HMDI).

The term homopolymer of an aliphatic or cycloaliphatic polyisocyanate as used in the context of the present invention means a higher molecular weight oligomeric polyisocyanate which is prepared from the polyisocyanate by using suitable modification reactions, such as dimerization or trimerization, for example, by formation of uretdione, isocyanurate, biuret or allophanate groups. A homopolymer of a polyisocyanate is formed by reacting a part of the isocyanate groups of, for example, a diisocyanate, such as HDI or IPDI, to form dimers, trimers or mixtures of dimers and trimers of the diisocyanate. Suitable homopolymers of aliphatic polyisocyanates and homopolymers of cycloaliphatic polyisocyanates, and mixtures thereof, can be prepared according to processes known per se. Such processes are described, for example, in US-A-20110281965, which is incorporated herein by reference.

In a preferred embodiment of the present invention, the at least one homopolymer of an aliphatic polyisocyanates (a1) is a homopolymer of hexamethylene-1,6-diisocyanate (HDI).

In a preferred embodiment of the present invention the at least one homopolymer of a cycloaliphatic polyisocyanate (a2) is a homopolymer of isophorone diisocyanate (IPDI).

Suitable mixtures (A) of homopolymers of HDI and IPDI to be used in accordance with the present invention can be prepared according to methods known per se, as described, for example, in US-A-20110281965, or are commercially available, for example, as DESMODUR® XP 2489 from Bayer Material Science.

Mixtures (A) of homopolymers of aliphatic polyisocyanates and homopolymers of cycloaliphatic polyisocyanates can be applied in accordance with the present invention, if their viscosity allows processing in accordance with known methods of casting, potting, encapsulation, or an impregnation. Suitable viscosity is in the range of from 2000 to 60,000 mPa s at 23° C., preferably of from 8,000 to 40,000 mPa s at 23° C. It has been found that processing is possible without the addition of solvent or reactive diluents, if the viscosity of the composition of said homopolymers is in the range as described above. Surprisingly, the outdoor articles received, for example, insulation systems for medium and high voltage electrical engineering, exhibit good mechanical, electrical and dielectrical properties.

The at least one polyol (B) suitable for use in the present invention includes polyether polyols and polyester polyols. Such polyols may be used alone or in suitable combination as a mixture.

The at least one polyol (B) is capable to react with component (A). Preferably the at least one polyol (B) has an average functionality as to OH-groups from 2.0 to 6.0. The equivalent ratio of isocyanate groups of the homopolymers of polyisocyanates (A) to isocyanate reactive hydroxy groups of the at least one polyol (B) is, for example, of from 0.5:1 to 1:0.5, preferably of 1:1.

The reaction of component (A) with a polyester polyol as the at least one polyol (B), is preferably carried out by maintaining an equivalent ratio of isocyanate groups to isocyanate reactive hydroxy groups, for example, of from 0.5:1 to 1:0.5, preferably of from 0.7:1 to 1:0.7, especially of from 0.9:1 to 1:0.9.

Polyester polyols as the at least one polyol (B) are compounds having at least two, preferably more than two ester groups, and at least two hydroxy groups, preferably more than two hydroxy groups per molecule.

Polyester polyols as the at least one polyol (B) are commercially available, or can be prepared according to methods known per se, for example by esterification, if applicable in the presence of a catalyst, for example an acid, a base or a transition metal compound. Esterification is carried out at a temperature, for example, of from 80° C. to 260° C., preferably, of from 100° C. to 230° C., until the final product exhibits the desired properties, for example the desired hydroxyl number or acid number. As suitable starting materials for the preparation of polyester polyols, there come into consideration, for example, aliphatic or cycloaliphatic dicarboxylic acids, saturated or unsaturated dicarboxylic acids, their anhydrides, and polyhydric aliphatic or cycloaliphatic alcohols, preferably diols and triols.

Suitable dicarboxylic acids for preparing the polyester polyols are selected from the group consisting of, for example, succinic acid, glutaric acid, adipic acid, pimelic acid, suberic acid, azelaic acid, sebacic acid, decandicarboxylic acid, maleic acid, fumaric acid, itaconic acid, hexahydrophthalic acid and tetrahydrophthalic acid, which are either used individually or as a mixture of at least two different compounds.

Suitable polyhydric alcohols for preparing the polyester polyols are selected from the group consisting of, for example, 1,2-ethanediol, 1,2- and 1,3-propanediol, isomers of butanediol, pentanediol, hexanediol, heptanediol and octanediol, 2-butyl-2-ethyl-1,3-propanediol, 1,10-decanediol, 1,12-dodecanediol, 1,2- and 1,4-cyclohexanediol, 1,4-cyclohexane dimethanol, 4,4'-(1-methylethylidene)biscyclohexanol, 1,2,3-propanetriol (glycerol), 1,1,1-trimethylolethane, 1,2,6,hexanetriol, 1,1,1-trimethylolpropane, 2,2-bis(hydroxymethyl)-1,3-propanediol, low molecular polyether diols, such as diethylene glycol and dipropylene glycol and mixtures of such alcohols.

In a certain embodiment polyester polyols are prepared by reacting succinic acid or adipic acid with 1,3-butanediol, 1,4-butanediol, 2,2-dimethyl-1,3-propanediol, 2,2,4-trimethyl-1,5-pentandiol, diethyleneglycol, glycerin or 1,1,1-trimethylolpropane.

Suitable polyester polyols can also be prepared in a known manner from lactones and simple polyhydric alcohols by ring opening reaction. Suitable lactones for preparing such polyester polyols are, for example, β-propiolactone, γ-butyrolactone, δ-valerolactone, ε-caprolactone, 3,5,5- and 3,3,5-trimethylcaprolactone or a mixtures thereof. Preferred is ε-caprolactone. The above mentioned polyhydric alcohols can be used individually, or as a mixture of at least two different polyhydric alcohols. The preparation of such lactone polyester polyols by ring opening polymerization is usually carried out in the presence of catalysts, for example, Lewis or Broenstedt acids, organic tin or titanium compounds at temperatures of from 20° C. to 200° C., preferably of from 50° C. to 200° C.

The average functionality of the polyester polyols as to the hydroxy groups is, for example, of from 2.0 to 6.0, preferably of from 2.0 to 4.0, especially of from 2.2 to 3.5.

The OH-number of the polyester polyol is, for example, of from 100 mg to 850 mg KOH/g, preferably of from 350 mg to 800 mg KOH/g, especially of from 400 to 750 mg KOH/g. The OH-number can be determined according to DIN 53240 T.2.

The acid number of the polyester polyol is, for example, 5 or lower than 5, preferably 3 or lower than 3. The acid number can be determined according to DIN 3682.

Polyether polyols as the at least one polyol (B) are compounds which have at least two, preferably more than two ether groups, and at least two hydroxy groups, preferably more than two hydroxy groups per molecule. The at least two ether groups constitute the main chain of the polyether polyols.

Polyether polyols as the at least one polyol (B) are commercially available, or can be prepared according to methods known per se, for example, by alkoxylation of a suitable polyhydric starting compound with alkylene oxide. Appropriately, basic or acid catalysts are used to accomplish alkoxylation. Basic catalysts which come into consideration are, for example, alkali hydroxides, such as sodium or potassium hydroxide, or alkali alcoholates, such as sodium methylate. Acid catalysts which come into consideration are, for example, Lewis acids, such as antimony pentachloride or boron trifluoride etherate, or double metal cyanides (DMC), such as tin hexacyano cobaltate. There come into consideration as polyhydric starting compounds for the preparation of the polyether polyols compounds having, for example, 2 to 6, preferably 3 or 4 active hydrogen atoms, such as aliphatic alcohols with 3 to 6 carbon atoms. Suitable aliphatic alcohols are selected from the group of, for example, ethylene glycol, propylene glycol, 1,3-butanediol, 1,4-butanediol, 1,6-hexanediol, neopentyl glycol, diethylene glycol, dipropylene glycol, 1,2,3-propane triol (glycerol), diglycerol, 1,1,1-trimethylol ethane, 1,2,6-hexanetriol, 1,1,1-trimethylol propane, 2,2-bis(hydroxymethyl)-1,3-propanediol (pentaerythritol), 1,2,4- and 1,3,5-trihydroxy cyclohexane and sorbitol. Suitable aliphatic amines are selected from the group of, for example, ethylene diamine, 1,3-propylene diamine and the butylene diamines including all isomers thereof, pentylene diamine and hexylene diamine, wherein one nitrogen atom may be mono $C_1$-$C_4$alkyl substituted. As $C_1$-$C_4$alkyl methyl or ethyl may be mentioned. Also aliphatic polyamines selected from the group of, for example, diethylene triamine and triethylene tetramine come into consideration. Another class of suitable polyhydric starting compounds are alkanolamines, for example, ethanolamine, dialkanolamine, such as diethanolamine, and trialkanolamine, such as triethanolamine. Starting compounds can be used individually or as a mixture of at least two different compounds. Suitable alkylene oxides for the alkoxylation reaction are, for example, ethylene oxide and propylene oxide, which are converted with the polyhydric starting compound to form the polyether polyols.

In one embodiment of the present invention polyether polyols are used which are adducts of ethyleneoxide and/or propyleneoxide with 1,2,3-propanetriol, 1,1,1-trimethylolpropane, ethylenediamine and/or pentaerythritol.

The average functionality of the polyether polyols as to the hydroxy groups is, for example, of from 3.0 to 6.0, preferably of from 3.0 to 5.0, especially of from 4.0 to 5.0.

The OH-number of the polyester polyol is, for example, of from 80 to 1000 mg KOH/g, preferably of from 110 to 800 mg KOH/g, especially of from 150 to 600 mg KOH/g. The OH-number can be determined according to DIN 53240 T.2.

The reaction of component (A) with a polyether polyol as the at least one polyol (B), is preferably carried out by maintaining an equivalent ratio of isocyanate groups to isocyanate reactive hydroxy groups, for example, of from 0.5:1 to 1:0.5, preferably of from 0.7:1 to 1:0.7, especially of from 0.8:1 to 1:0.8.

In one embodiment of the present invention, the at least one polyol (B) is at least one polyether polyol. Preferably, the at least one polyether polyol (B) is one of ethylene oxide polyether polyols, propylene oxide polyether polyols, and copolymers of ethylene and propylene oxide with terminal hydroxyl groups derived from polyhydric starting compounds.

The molecular weight of the at least one polyether polyol (B) is, for example, of from 200 to 10,000, preferably of from 500 to 5,000.

The at least one filler (C) is either commercially available or can be prepared according to processes known per se, for example, by silanization of suitable fillers with epoxy silane or amino silane. Suitable silica is, for example, crystalline or amorphous silica, especially fused silica.

Preferably the at least one filler (C) is selected, for example, from the group of quartz sand, quartz powder, crystalline silica, amorphous silica, fused silica, wollastonite, aluminium oxide, $Al(OH)_3$, $AlO(OH)$, and calcium carbonate, wherein the at least one filler may be silanized.

The amount of silanized filler (C) in the final composition can vary in wide ranges and is dependent on the use of the composition. In case the composition is used for the preparation of insulation systems for medium and high voltage electrical engineering, the amount of filler (C) is, for example, of from 30 wt % to 75 wt %, based on the total weight of the curable composition. In one embodiment, the amount of filler (C) is, for example, of from 40 wt % to 75 wt %, based on the total weight of the curable composition. In another embodiment, the amount of filler (C) is, for example, of from 50 wt % to 70 wt %, based on the total weight of the curable composition. In still another embodiment, the amount of filler (C) is, for example, of from 50 wt % to 60 wt %, based on the total weight of the curable composition.

Further additives may be selected from processing aids to improve the rheological properties of the curable composition, hydrophobic compounds including silicones, wetting/dispersing agents, plasticizers, dyes, pigments, reactive or non-reactive diluents, flexibilizers, accelerators, antioxidants, light stabilizers, flame retardants, fibers, fungicides, thixotropic agents, toughness improvers, antifoams, antistatics, lubricants, anti-settling agents, water scavenger and mould-release agents and other additives generally used in electrical applications. These additives are known to the person skilled in the art.

In one embodiment the curable composition comprises
(A) a mixture of homopolymers of isocyanates comprising
  (a1) from 50 wt % to 90 wt % of at least one homopolymer of hexamethylene-1,6-diisocyanate, and
  (a2) from 10 wt % to 50 wt % of at least one homopolymer of isophorone diisocyanate, each based on the total weight of (a1) and (a2),
(B) at least one polyether polyol selected from ethylene oxide polyether polyols, propylene oxide polyether polyols and copolymers of ethylene and propylene oxide with terminal hydroxyl groups derived from polyhydric starting compounds, and
(C) at least one filler selected from the group of quartz sand, quartz powder, crystalline silica, amorphous silica, fused silica, wollastonite, aluminium oxide, Al(OH)$_3$, AlO(OH), and calcium carbonate, wherein the at least one filler may be silanized.

The curable composition according to the present invention are R42-free and SVHC-free, and distinguished by a low water pick-up, a very good water diffusion break down strength, good tracking and erosion resistance and a long pot life (good latency).

The curable composition according to the present invention can advantageously be used for the manufacturing of insulation systems for medium and high voltage electrical engineering, in particular, insulation systems exposed to outdoor environment, for example, outdoor insulators and bushings, outdoor instrument transformers and distribution transformers, outdoor switch gears, reclosers, load break switches and locomotive insulators.

The curable compositions can also be used for the manufacturing of other articles exposed to outdoor environment, for example, composite articles, such as water pipes and water containers, or coatings for air core reactors.

The glass transition temperature of the articles prepared from the curable resin composition according to the present invention can be adjusted as desired, for example, in the range of from 50° C. to 170° C.

Generally, insulation systems are prepared by casting, potting, encapsulation, and impregnation processes such as gravity casting, vacuum casting, automatic pressure gelation (APG), vacuum pressure gelation (VPG), infusion, and the like.

A typical process for making insulation systems for medium and high voltage electrical engineering is automatic pressure gelation (APG).

In a typical APG process, a metal conductor or an insert, which is pre-heated and dried, is placed into the mold located in a vacuum chamber. After closing of the mold by an opening and closing system, the curable composition is injected into the mold from an inlet located at the bottom of the mold by applying pressure to the composition mixing tank. Before injection, the curable composition is normally held at a moderate temperature of 40 to 60° C. to ensure an appropriate pot life, while the temperature of the mold is kept at around 120° C. or above to obtain the casting products within a reasonably short time. After injection of the curable composition into the hot mold, the composition cures while the pressure applied to the composition in the mixing tank is kept at about 0.1 to 0.5 MPa.

Large casting products made of more than 10 kg of composition may be produced conveniently by the APG process within a short time, for example, of from 15 to 60 minutes. Normally, the casting product released from the mold is post cured in a separate curing oven to complete the reaction of the composition.

The present invention also relates to a process for the preparation of outdoor articles, wherein a curable composition is used, said composition comprising
(A) a mixture of homopolymers of polyisocyanates comprising
  (a1) from 50 wt % to 90 wt % of at least one homopolymer of an aliphatic poly-isocyanate, and
  (a2) from 10 wt % to 50 wt % of at least one homopolymer of a cycloaliphatic poly-isocyanate, each based on the total weight of (a1) and (a2),
(B) at least one polyol selected from the group of polyether polyol and polyester polyol, and
(C) at least one filler selected from the group of quartz sand, quartz powder, silica, aluminium oxide, titanium oxide, zirconium oxide, Mg(OH)$_2$, Al(OH)$_3$, dolomite [CaMg(CO$_3$)$_2$], AlO(OH), silicon nitride, boron nitride, aluminium nitride, silicon carbide, boron carbide, chalk, calcium carbonate, barite, gypsum, hydromagnesite, zeolites, talcum, mica, kaolin and wollastonite, wherein the at least one filler may be silanized.

The definitions and preferences given above apply also to the process for the preparation of outdoor articles according to the present invention.

The process according to the present invention is, in particular, useful for the preparation of encased articles for outdoor use exhibiting good mechanical, electrical and dielectrical properties.

In one embodiment of the inventive process, the said outdoor articles are insulation systems for medium and medium and high voltage electrical engineering, in particular, insulation systems prepared by casting, potting, encapsulation, and impregnation processes such as gravity casting, vacuum casting, automatic pressure gelation (APG), vacuum pressure gelation (VPG), filament winding, pultrusion and infusion. Preferred are automatic pressure gelation (APG) and vacuum casting, especially automatic pressure gelation (APG).

Examples of outdoor articles, which also can be manufactured in accordance with the inventive process, are hollow core insulators by filament winding, or rods for composite insulators by pultrusion.

Accordingly, the present invention is also directed to outdoor articles, obtained by the process according to the present invention, for example, an insulation system article.

The glass transition temperature of the article is in the same range as for known anhydride based thermosetting epoxy resin compositions. The flexural strength of the article is 110 MPa or higher.

Possible uses of the electrical insulation system articles prepared according to the present invention are, for example, outdoor recloser, outdoor load break switchgears, outdoor instrument transformer, outdoor distribution transformer, outdoor insulators, outdoor bushings, railway insulators, and electrical articles for indoor application requiring high tracking and erosion resistance and/or water diffusion strength, for example, DDT for off-shore wind power generators.

In particular the articles prepared in accordance with the inventive process are used for medium and high voltage electrical insulation system articles (1 kV to 145 kV).

The following Examples serve to illustrate the invention. Unless otherwise indicated, the temperatures are given in degrees Celsius, parts are parts by weight and percentages relate to % by weight. Parts by weight relate to parts by volume in a ratio of kilograms to litres.

Description of ingredients:

CY184: Low viscous cycloaliphatic epoxy resin with an epoxy equivalent of 5.8 to 6.1 Eq/kg. Supplier: Huntsman, Switzerland.

HY1235BD: Liquid, modified cycloaliphatic anhydride hardener. Supplier: Huntsman, Germany DY062: Benzyldimethylamine, catalyst for epoxy/anhydride. Supplier: Huntsman, China.

W12EST: Silica treated with epoxysilane. Supplier: Quarzwerke, Germany.

Apyral 2E: ATH-filler. Supplier: Nabaltek, Germany

DESMODUR® XP 2489: Mixture of homopolymer of hexamethylene-1,6-diisocyanate (70 wt %) and of homopolymer of isophorone-diisocyanate 30 wt %. Supplier: Bayer, Germany Poly G 73-490: Polypropylene glycol, OH-value: 480 to 500 mg KOH, viscosity: 10 Pa s at 25° C., molecular weight: 515 g/mol, functionality: 4.5. Supplier: American Arch, USA Bentone SD-2: Antisettling agent based on bentonite. Supplier: Elementis Specialties, USA Byk 088: Defoaming agent. Supplier: Byk-Chemie, Germany Byk W969: Wetting agent. Supplier: Byk-Chemie, Germany UOP L Powder: Water scavenger (molecular sieve, zeolith). Supplier: Honeywell, USA Dabco 33LV: Mixture of 1,4-Diazabicyclo[2.2.2]octane (triethylene diamine) (33 wt %) and dipropylene glycol (67 wt %), accelerator for polyurethanes. Supplier: Air products, USA Comparative Example 1

CY184 is preheated at 80° C. in an oven for 0.5 h. In a steel vessel, 180 g of HY1235BD are added to 200 g of preheated CY184 under stirring for about 5 minutes. Then, 740 g of W12EST are added to the stirred mixture in portions within 20 minutes. Subsequently, the composition in the vessel is preheated in an oven at 80° C. for 0.5 h, the vessel is removed from the oven, 1.2 g of DY062 are added, and stirring is continued for 5 minutes. A small sample of the mixture without filler (W12EST) is used to measure the Gel time at 140° C. Stirring is discontinued and the composition in the vessel is degassed carefully by applying a vacuum for about 2 to 3 minutes. The composition is poured into a hot aluminium mold treated with a mold release agent QZ13 and preheated to 80° C., to prepare specimens of 4 mm, 6 mm and 10 mm thickness for testing. The composition in the mold is degassed carefully by applying a vacuum for about 1 to 2 minutes, and cured in an oven at 80° C. for 6 h, and at 140° C. for another 10 h. After curing, the specimens are removed from the mold and allowed to cool to ambient temperature.

Comparative Example 2

See page 500 of the book "Polyurethane" (Kuntstoff Handbuch, Band 7, 3. Aufl., ISBN 3-446-16263-1, Hrsg. G. Oertel).

Example 1

A 3 L vacuum disperser and mixer chamber is preheated in an oven at 100° C. Then, 500 g of Poly G73-490, 15 g of Bentone SD-2, 5 g of Byk 088, 15 g of Byk W969, 10 g UOP L Powder are accurately weighted and placed in the preheated chamber. The chamber is closed and stirred with the mixer speed at 200 rpm and disperser speed at 1500 rpm for 2 h under vacuum until the composition is homogeneous. Stirring is discontinued and the chamber is cooled to 60° C. Then, 955 g of DESMODUR® XP2489 and 1.5 g of Dabco 33LV are added to the composition and stirring is continued for 5 minutes. Stirring is discontinued again and 1500 g (50 wt %) preheated dry filler W12EST are added to the composition. A small sample of the mixture without filler (W12EST) is used to measure the Gel time at 140° C. Stirring is continued with the mixer speed at 200 rpm and disperser speed at 1500 rpm for 2 h under vacuum until the composition is homogeneous and no bubbles are formed.

Stirring is discontinued and the composition is injected under pressure into a hot aluminium mold treated with a mold release agent and preheated to 80° C., to prepare specimens of 4 mm, 7 mm and 10 mm thickness for testing. The composition in the mold is cured in an oven at 80° C. for 3 h, at 120° C. for another 3 h and at 160° C. for another 10 h. After curing, the specimens are removed from the mold and allowed to cool to ambient temperature.

Example 2

Example 1 is repeated, but 1910 g (56 wt %) of preheated Apyral 2E are used instead of 1500 g (50 wt %) of W12EST.

TABLE 1

Test data

| | Example | | | |
|---|---|---|---|---|
| | Comp Ex 1 | Comp Ex 2 | Ex 1 | Ex 2 |
| Gel time at 140° C.[1] [min] | 3.4 | no info available | 13 | 13 |
| Pot life at 40° C.[2] | OK | no info available | OK | OK |
| Flexural strength[3] [MPa] | 146 | 140 (DIN 53452) | 167 | 74 |
| Tg[4] [° C.] | 111 | 150 | 102 | 102 |
| Water diffusion test[5] | P at 12 kV | P at 12 kV (DIN VDE 0441/1) | P at 12 kV | P at 12 kV |
| Tracking Resistance[6] | P | P at 4.5 kV (DIN VDE 0441/1) | F | P |
| R 42 | F | F | P | P |

TABLE 1-continued

Test data

| | Example | | | |
|---|---|---|---|---|
| | Comp Ex 1 | Comp Ex 2 | Ex 1 | Ex 2 |
| Toxic components | F (DY 062) | | P | P |

[1] Gel norm method; specimens without filler
[2] Target > 6 h
[3] ISO 527
[4] IEC 1006; Differential Scanning Calorimetry on a Mettler SC 822e (range: 20 to 250° C. at 10° C. min$^{-1}$)
[5] IEC 62217; boiling for 100 h
[6] IEC 60587; Tracking at 3.5 kV (pass at least 4 of 5 specimens)
P = test passed;
F = test failed Comparative Example 1 is based on anhydride curing, and represents the state of the art composition in use for casting, potting and encapsulation since more than 40 years. It performs well in all aspects, except that the anhydride used is R 42 labelled (may cause sensitization by inhalation) and SVHC listed.

Comparative Examples 2 is PU system based on IPDI and polyether polyol, and represents the most relevant state of the art composition in use for outdoor articles. It performs well in all aspects, except for the free IPDT which is R 42 labelled (may cause sensitization by inhalation).

The inventive compositions of Examples 1 and 2 both exhibit a long pot life, and pass the water diffusion test. The mechanical performance is comparable to state of the art systems currently in use.

What is claimed is:

1. A process for the preparation of an outdoor article for electrical applications, comprising:
    contacting an article capable of conducting 1 to 145 kV of electricity with the reaction product of a composition comprising:
    (A) a mixture of homopolymers of polyisocyanates comprising
        (a1) from 50 wt % to 90 wt % of at least one homopolymer of an aliphatic poly-isocyanate comprising ethylene diisocyanate, 1,4-tetramethylene diisocyanate or 1,12-dodecane diisocyanate, and
        (a2) from 10 wt % to 50 wt % of at least one homopolymer of a cycloaliphatic poly-isocyanate comprising uretdione, biuret or allophonate groups,
    wherein the amount of each of (a1) and (a2) are based on the total weight of (a1) and (a2),
    (B) at least one polyol selected from the group of polyether polyol and polyester polyol, and
    (C) an epoxy silanized filler or an amino silanized filler wherein the filler is selected from the group of quartz sand, quartz powder, silica, aluminium oxide, titanium oxide, zirconium oxide, Mg(OH)$_2$, aluminum hydroxide, dolomite, aluminum oxide hydroxide, silicon nitride, boron nitride, aluminium nitride, silicon carbide, boron carbide, chalk, calcium carbonate, barite, gypsum, hydromagnesite, zeolites, talcum, mica, kaolin and wollastonite.

2. The process of claim 1, wherein the step of contacting the article capable of conducting 1 to 145 kV of electricity with the reaction product of a composition comprising subjecting the article to a casting, potting, encapsulation, or an impregnation process using the composition.

3. The process of claim 1, wherein the step of contacting the article capable of conducting 1 to 145 kV of electricity with the reaction product of a composition comprises subjecting the article to an automatic pressure gelation or vacuum casting process using the composition.

4. The process of claim 1, wherein the article capable of conducting 1 to 145 kV of electricity is selected from a recloser, load break switchgear, instrument transformer, distribution transformer, bushing, and electrical wire.

5. An article obtained by the process according to claim 1.

* * * * *